Patented Oct. 5, 1948

2,450,682

UNITED STATES PATENT OFFICE 2,450,682

POLYMERS OF AN UNSATURATED ALKYD RESIN AND AN UNSATURATED HALOGENATED COMPOUND AND METHOD OF PRODUCING SAME

Birger W. Nordlander, Schenectady, N. Y., assignor to General Electric Company, a corporation of New York No Drawing. Application April 30, 1946,
Serial No. 666,203

10 Claims. (Cl. 260—45.4)

This application is a continuation-in-part of my copending application Serial No. 302,165, filed October 31, 1939, now abandoned and assigned to the same assignee as the present invention.

This invention relates to the production of new materials having valuable and characteristic properties that make them especially suitable for use in industry, for example in molding, laminating, casting, coating and adhesive applications, and for other purposes. The invention is concerned more particularly with compositions of matter comprising an interpolymer (copolymer) or interpolymers of copolymerizable ingredients including at least one polymerizable polyhydric alcohol ester of an alpha unsaturated alpha beta polycarboxylic acid (hereafter for brevity designated generally as an "unsaturated alkyd resin" and is not intended to include the conventional drying oil-modified alkyd resins) with at least one polymerizable polyester compatible with the unsaturated alkyd resin and obtained by esterifying a nuclearly halogenated aromatic polycarboxylic acid or anhydride, e. g., monobromophthalic, monochlorophthalic, dichlorophthalic, dibromophthalic, trichlorophthalic, tetrachlorophthalic acids or anhydrides, etc., with an unsaturated monohydric alcohol, e. g., allyl alcohol.

The polyesters of unsaturated monohydric alcohols used in carrying the present invention into effect may be considered as being members of the class of esters which may be represented by the formula

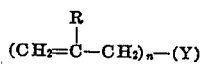

where R is a member of the class consisting of hydrogen, unsubstituted hydrocarbon radicals and substituted hydrocarbon radicals, for instance hydrocarbon radicals containing substituent groups such as halogeno, acyloxy, alkoxy, aryloxy, nitro, acyl, nitrilo, aldehydo, etc., $n$ has a numerical value of at least 2 and Y represents the radical of an aromatic polycarboxylic acid (or an anhydride thereof if available) containing at least two carboxy groups and from 1 to 4 halogens, preferably 4, in the aromatic nucleus. Thus, R may be, for example, an alkyl radical such as methyl, ethyl, propyl, isopropyl, butyl, secondary-butyl, isobutyl, amyl, isoamyl, hexyl, octyl, etc.; and aralkyl radical, e. g., benzyl, phenylethyl, phenylpropyl, etc.; a carbocyclic radical such, for example, as phenyl, cresyl, halo-phenyl, xylyl, tolyl, naphthyl, cyclohexyl, methylcyclohexyl, etc.; and Y is a radical of a nuclearly halogenated aromatic polycarboxylic acid, e. g., halogenaphthalic, e. g., tetrachlorophthalic acid or anhydride, halogenoterephthalic, halogenoisophthalic, halogenobenzophenone - 2,4' dicarboxylic, halogenodiphenic, halogenonaphthalic, etc. Any of the halogen derivatives of aromatic polycarboxylic acids may be employed but I prefer to use the chloro derivatives. For purposes of brevity the terms "nuclearly halogenated polycarboxylic acid" and "nuclearly halogenated aromatic dicarboxylic acid," as used generally herein and in the appended claims, are intended to include within their meaning the halogenated aromatic polycarboxylic acids, that is, aromatic polycarboxylic acids containing halogen in the aromatic nucleus.

From the above formula, it will be seen that polyesters, the alcohol radicals of which contain the grouping

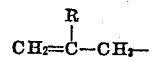

are embraced by this invention. The term "polyallyl ester of a nuclearly halogenated aromatic polycarboxylic acid" as used generally herein and in the appended claims is intended to include within its meaning polymerizable esterification products of unsaturated monohydric alcohols, such as above indicated by way of example, with a nuclearly halogenated aromatic polycarboxylic acid having at least two esterifiable carboxy groups and at least one and not more than four halogens attached to the aromatic nucleus, the number of halogens present depending in some measure on the number of carboxy groups. In the preferred embodiments of the invention, I prefer to use a compound wherein the aromatic nucleus contains four halogens in the ring and two carboxy groups, e. g., diallyl tetrachlorophthalate.

Compositions produced in accordance with my invention are especially adapted for use as "solventless varnishes," for instance as coating compositions and binders in the production of laminated sheets and tapes for use in insulating electrical devices, as well as for other applications.

It has long been recognized that the varnishes heretofore commonly used in such applications as above mentioned possess certain inherent disadvantages which it has not been possible to overcome or eliminate in spite of many efforts. These varnishes have one common characteristic, that is, they contain an inert, volatile, solvent which must be expelled during the curing process. In addition, many of the resin bases used in such varnishes require the absorption of oxygen from the atmosphere for their conversion into an insoluble and infusible condition. When such varnishes are used as binders in the production of electrical insulation of substantial thickness, as for instance in the case of laminated mica flake insulation of coils and bars for high voltage equipment, it is a very difficult task completely to remove all the solvent from the interior of the insulation layer. Usually the coil or bar has to be given a long heat treatment under reduced pressure. However, during this treatment the outer part of the insulation layer commences to cure, which action tends to seal the coil. This hinders both the escape of the solvent from the interior of the insulation and a thorough cure of the whole mass. The pressure of entrapped solvent in the insulation may lead to very serious difficulties. When a coil is subjected to an increase in temperature, such as takes place in the operation of the equipment of which it is a part, an internal pressure will be exerted on the insulation where the solvent is entrapped. This entrapped solvent also has a softening action upon the varnish base with obvious disadvantages. This combination of effects may result in voids forming in the interior with a resulting puffing of the mass. Due to the corona formed in these voids under the high voltage stress, the dielectric strength of the insulating material is impaired. In addition, the presence of uncured low molecular weight material in the binder may cause the dielectric losses to increase.

Due to the above-described difficulties there has long been a need in the electrical industry for a type of non-volatile, fluid varnish suitable for insulation applications, which varnish would eliminate the necessity of removing solvents and the need of absorbing oxygen from the atmosphere during curing and which, furthermore, would cure through completely even in large thicknesses.

I have discovered that all these requirements can be attained very satisfactorily by forming a mixture comprising an unsaturated alkyd resin or resins and a polymerizable polyallyl ester or esters of a nuclearly halogenated aromatic polycarboxylic acid (as above defined), which ester is compatible with the alkyd resin component and which mixture also preferably contains a polymerization catalyst; applying the mixture to the materials to be coated or bonded together or otherwise treated; and treating the mixed components as hereafter more fully described to form an interpolymer of the same.

A very practical advantage accruing from my invention is that it provides new compositions adapted for the production of cast or molded massive bodies. The unsaturated alkyd resins alone are unsuited, even in the presence of polymerization catalysts such as peroxides, for the preparation of practically useful cast or molded articles of substantial size. If effort be made to prepare commercially useful massive bodies from the unsaturated alkyds alone, even prolonged heat treatment in the presence of a polymerization catalyst usually gives unsuitable materials. The cast or molded articles generally are filled with bubbles or show cracks, or both, when cured.

In carrying the present invention into effect an unsaturated alkyd resin is first prepared in accordance with technique now well known to those skilled in the alkyd resin art. Any polyhydric alcohol containing at least two esterifiable aliphatic hydroxyl groups, or mixtures of such alcohols, may be used in producing the unsaturated alkyd resin. Examples of such polyhydric (dihydric, trihydric, etc.) alcohols are ethylene glycol, di- and tri-ethylene glycols, propylene glycol, trimethylene glycol, glycerine, pentaerythritol, etc. It is understood, of course, that modifications with monohydric alcohols may also be made by incorporating a monohydric alcohol at the time the unsaturated alkyd resin is prepared. Examples of such monohydric alcohols are cyclohexanol, 2-ethylhexanol, undecanol, phenyl cellosolve (ethylene glycol monophenyl ether), butyl cellosolve (ethylene glycol monobutyl ether), methyl carbitol (diethylene glycol monoethyl ether), carbitol (diethylene glycol monoethyl ether), etc. Examples of alpha unsaturated alpha beta polycarboxylic acids, or mixtures of such acids, which may be reacted with the polyhydric alcohol or alcohols to form the unsaturated alkyd resin are maleic, fumaric, itaconic, messaconic, etc. If available, anhydrides of these polycarboxylic acids may be employed. The terms "polycarboxylic acid" and "dicarboxylic acid" as used generally herein therefore are intended to include within their meanings the anhydrides of such acids.

The polyesters of unsaturated monohydric alcohols used in carrying the present invention into effect may be symmetrical or unsymmetrical polyesters such as the diallyl, dialkallyl (e. g., dimethallyl, diethallyl, dipropallyl, etc.), allyl methallyl, allyl ethallyl, etc., esters of nuclearly halogenated aromatic polycarboxylic acids such, for instance, as nuclearly halogenated phthalic, isophthalic, terephthalic, benzophenone-2,4' dicarboxylic acids, etc., or the anhydrides of such acids if available. I prefer to use the simple instead of mixed polyesters, more specifically diallyl and the dimethallyl and other dialkallyl esters of nuclearly halogenated phthalic acid or anhydride. The only requirement of the polyallyl ester is that it be polymerizable and that it be compatible with the particular unsaturated alkyd resin employed. The solubility or compatibility of the components with respect to each other depends, for example, upon the particular polyhydric alcohol used in making the resin and the length of the chain in the allyl ester radical. In general, the longer the chain in the allyl radical, the less compatible is the polyallyl ester with the unsaturated alkyd resin.

In effecting interpolymerization between the polymerizable esters employed in practicing my invention I prefer to use a small amount of a polymerization catalyst accompanied by heat, light, or heat and light. Examples of catalysts which may be used are ozone and ozonides; inorganic super-oxides such as barium peroxide, sodium peroxide, etc.; dialkyl peroxides such as lauryl peroxide, stearyl peroxide, etc.; symmetrical diacyl peroxides, e. g., acetyl peroxide, lauroyl peroxide, stearoyl peroxide, benzoyl peroxide, etc.; unsymmetrical or mixed diacyl peroxides, e. g., acetyl benzoyl peroxide, etc.; peracids, e. g., peracetic acid, etc.; terpene peroxides such as ascaridole, etc.; peroxides of the drying oils such as those formed upon oxidation of linseed oils, etc.; and various other percompounds such, for instance, as perborates, e. g., sodium and potassium perborates, etc.; persulfates, e. g., sodium and potassium persulfates, etc.; perchlorates, e. g., sodium and potassium perchlorates, etc. Chlorates such, for instance, as sodium and potassium chlorates also may be used as polymerization catalysts. Benzoyl peroxide is the preferred catalyst. Any suitable catalyst concentration may be used but, in general, the catalyst concentration will be within the range of 0.1 to 2.0 per cent by weight of the whole.

When rapidity of copolymerization is of secondary importance, copolymerization between the components may be effected merely under the influence of heat, light, or heat and light and in the absence of an accelerator of polymerization. The rate of copolymerization and the properties of the final product vary with the time, temperature and, if a catalyst is used, also with the catalyst concentration. Copolymerization may be effected at from room temperature (20°–30° C.) to temperatures above 100° C., for example about 130° C., but ordinarily I use temperatures within the range of about 80° to 130° C. in causing the mixed or dissolved components to interpolymerize.

In order that those skilled in the art better may understand how the present invention may be practiced, the following illustrative examples thereof are given. All parts are by weight:

The compound, diallyl tetrachlorophthalate, was prepared in the following manner:

|  | Parts | Approx. Mol Ratio |
| --- | --- | --- |
| Allyl alcohol | 232.0 | 4 |
| Tetrachlorophthalic anhydride | 288.0 | 1 |
| d-Camphor sulfonic acid | 27.6 |  |

The above ingredients were mixed together in a 3-necked, glass, round-bottom flask equipped with a thermometer, a sealed stirrer, and a short take-off column attached to a water condenser. The mass was heated at its reflux temperature (about 85–90° C.) for about 13½ hours while the distillate was collected in a separate vessel. After this time, about 116 parts allyl alcohol were added to the reaction mixture, and the reflux continued for an additional 3 hours. The residue in the flask was washed with water and sodium carbonate until it was neutral to litmus paper. The viscous oily layer was extracted with ether by repeated washings and dried over anhydrous $CaCl_2$. The ether solution was distilled to remove the ether and the resulting liquid was fractionally distilled to obtain a fraction boiling between 189–191° C. at about 1.6 mm. This fraction, which was solid at room temperature, was further purified by recrystallization from petroleum ether to yield about 77 parts (approximately 20% of the theoretical) of substantially pure diallyl tetrachlorophthalate melting at about 73–74° C.

Example 1

|  | Parts |
| --- | --- |
| Diethylene glycol maleate | 25 |
| Diallyl tetrachlorophthalate | 25 | containing 0.25 part benzoyl peroxide yielded a very tough, hard, slightly cloudy, insoluble and infusible copolymer when heated for 24 hours at 80° and 24 hours at 100° C.

Example 2

|  | Parts |
| --- | --- |
| Diethylene glycol maleate | 20 |
| Diallyl tetrachlorophthalate | 40 | containing 0.2 part benzoyl peroxide yielded insoluble and infusible copolymers having the same properties as found in the copolymer prepared in Example 1, when heated for 24 hours at 80°, 24 hours at 100°, and 48 hours at 125° C.

Example 3

|  | Parts |
| --- | --- |
| Dipropylene glycol maleate | 25 |
| Diallyl tetrachlorophthalate | 25 | having incorporated therein 0.25 part benzoyl peroxide gave an insoluble, infusible, clear, hard but somewhat brittle copolymer when heated for 6.5 hours at 80° and 25 hours at 100° C.

Example 4

|  | Parts |
| --- | --- |
| Glyceryl cyclohexyl maleate | 25 |
| Diallyl tetrachlorophthalate | 25 | containing 0.13 part benzoyl peroxide gave a very hard, clear, insoluble and infusible copolymer when heated for 6 hours at 80° and 24 hours at 100° C.

The unsaturated alkyd resins used in Examples 1–3 were prepared by effecting reaction between approximately equimolecular proportions of the individual components until, say, an acid value of the order of 20 to 50 had been obtained. A slight molecular excess of the glycol was used in each case better to cause the reaction to go to completion. It will be understood, of course, by those skilled in the art that proportions other than approximately equimolecular quantities may be employed. For instance, in Example 4, 1 mol glycerine, 3 mols cyclohexyl alcohol and 3 mols maleic anhydride were caused to react with each other in order to obtain an alkyd resin having an acid value of 25–30. The ratio of the polyhydric alcohol to the polycarboxylic acid will vary depending on the particular service application.

In certain cases, instead of copolymerizing a single polymerizable polyallyl ester of a nuclearly halogenated aromatic polycarboxylic acid with a single polymerizable unsaturated alkyd resin, I may copolymerize a plurality of such esters either with a single unsaturated alkyd resin or with a plurality of such resins. In this way it is possible to obtain a composition comprising a mixture of interpolymers best adapted to meet a particular service application.

It will be understood, of course, that my invention is not limited to the particular proportions of the individual components given in the above illustrative examples, and that the proportions may be varied depending upon the particular properties desired in the interpolymer. Thus, the incorporation into an unsaturated alkyd resin of as little as 5 per cent of certain polymerizable polyallyl esters of a nuclearly halogenated aromatic polycarboxylic acid, for example, diallyl tetrachlorophthalate and dimethallyl tetrachlorophthalate, yields copolymers of improved properties as compared with unsaturated alkyd resins which have been polymerized in the absence of such esters. Depending upon the particular purpose for which the material is to be used, the percentage proportions of the initial components generally are within the range of 10 to 90 per cent of the polyallyl ester to 90 to 10 per cent of the unsaturated alkyd resin, the preferable range being from 15 to 75 per cent of the former to 85 to 25 per cent of the latter.

The interpolymerization products of this invention have a wide range of properties. Depending upon the particular starting components, the particular proportions thereof, the conditions of polymerization and the extent of the interpolymerization, they vary from soft, flexible, soluble bodies to rubbery and hard, rigid masses of varying resistances to solvents. In intermediate stages of copolymerization some form fluid compositions of varying intrinsic viscosities and may be so used. For coating and impregnating applications where the presence of a small amount of solvent in the cured composition is not objectionable, the mixed polymerizable materials may be diluted with volatile or nonvolatile solvents to viscosities best adapted to meet the particular service application, and then may be copolymerized after application of the solution to the particular article to be coated or impregnated. By suitable selection of the starting materials and the conditions of interpolymerization, interpolymers can be obtained in an insoluble, infusible state practically resistant to the destructive effect of other chemical bodies such as acids, bases, solvents and the like.

These new interpolymers or a mixture of the copolymerizable materials may be used alone or with fillers or other modifying agents, for example, in casting and molding applications, as adhesives, impregnants and surface-coating materials. They may be used as impregnants for many porous bodies, such as cork, pottery, felts, or fabricated bodies with interstices, e. g., the windings of electrical coils, netted fiber, interwoven fibrous materials, etc. They also may be used for protectively coating impervious articles such as metals, or for coating or coating and impregnating articles such as paper, wood, cloth, glass fibers in felted, woven or other form, concrete, synthetic boards, etc. They also may be employed in the production of wire enamels. The mixed components or partial interpolymers thereof, with or without modifying agents, may be cast and molded under heat or under heat and pressure. They also may be molded by injection, extrusion or compression molding technique whereby they are heat- and pressure-hardened to yield molded articles of manufacture for various industrial, household and novelty uses.

The polymerizable compositions of this invention are especially adapted for use as "solventless varnishes," for example, in electrically insulating applications such as in the production of winding tapes. Thus, they may be used as a binding agent for mica in making a mica tape. In producing mica tapes a suitable flexible, sheet insulating material such as cellulose itself and cellulose derivatives, for example, Japanese tissue paper, cellulose esters and ethers such a cellulose acetate, ethyl cellulose, etc., is coated with the varnish and upon this is placed flake mica also wetted with the varnish, followed usually by another layer of flexible sheet material, which also is completely wetted with the varnish. Upon curing the resin bond in situ at temperatures of the order of 80° to 100° C., a unitary laminated mica product is obtained.

By copolymerizing unsaturated alkyd resins with these unsaturated monohydric alcohol esters of nuclearly halogenated aromatic polycarboxylic acids, interpolymers of high resistance to flame can be produced. Such flame-resisting compositions are especially suitable for use in electrically insulating applications.

It will, of course, be understood that other nuclearly halogenated aromatic polycarboxylic acids or anhydrides may be employed in preparing polyallyl esters of the nuclearly halogenated aromatic polycarboxylic acids or anhydrides. Among these may be mentioned 4-chlorophthalic acid, 4-bromophthalic anhydride, 3,6-dichlorophthalic acid or anhydride, 3,6-difluorophthalic acid, 3,4,6-trichlorophthalic acid or anhydride, 3,4,6-triiodophthalic acid or anhydride, tetrabromophthalic, tetrafluorophthalic acids or anhydrides, etc. Nuclearly halogenated aromatic polycarboxylic acids or anhydrides other than the nuclearly halogenated phthalic acids or anhydrides may also be used, e. g., the nuclearly halogenated terephthalic, isophthalic, naphthalic, etc., acids or anhydrides.

What I claim as new and desire to secure by Letters Patent of the United States is:

1. A product comprising an interpolymer of a diallyl ester of a nuclearly chlorinated phthalic acid and an unsaturated alkyd resin, the allyl residues of the diallyl ester being unsubstituted, and the two ingredients comprising the interpolymer being compatible and copolymerizable.

2. A product comprising an interpolymer of a diallyl chlorophthalate and an unsaturated alkyd resin, the allyl residues of the diallyl ester being unsubstituted, and the two components comprising the interpolymer being compatible and copolymerizable with each other.

3. A composition comprising an interpolymer of diethylene glycol maleate and a diallyl ester of a nuclearly chlorinated phthalic acid, the allyl residues of the diallyl ester being unsubstituted and the two components of the interpolymer being compatible and copolymerizable with each other.

4. As a new product an interpolymer of diallyl tetrachlorophthalate and an unsaturated alkyd resin, the two components of the interpolymer being compatible and copolymerizable with each other.

5. A polymerizable composition comprising (1) an unsaturated alkyd resin and (2) a diallyl ester of a nuclearly chlorinated phthalic acid, the allyl residues of the diallyl ester being unsubstituted, and the ingredients (1) and (2) being copolymerizable and compatible with each other.

6. A polymerizable composition comprising (1) an unsaturated alkyd resin, (2) diallyl tetrachlorophthalate, and (3) a polymerization catalyst for accelerating the copolymerization of the materials of (1) and (2).

7. The method of producing an insoluble and infusible resinous composition which comprises (a) forming a mixture of (1) an unsaturated alkyd resin, (2) a diallyl ester of a nuclearly chlorinated phthalic acid, the allyl residues being free of substitution, and (3) a catalyst for accelerating the copolymerization of (1) and (2), and (b) heating the mixture until an insoluble, infusible resin results.

8. As a new product, an interpolymer of diallyl tetrachlorophthalate and diethylene glycol maleate.

9. As a new product, an interpolymer of diallyl tetrachlorophthalate and dipropylene glycol maleate.

10. As a new product, an interpolymer of (1) diallyl tetrachlorophthalate and (2) glyceryl cyclohexyl maleate.

BIRGER W. NORDLANDER.

REFERENCES CITED

The following references are of record in the file of this patent:

UNITED STATES PATENTS

| Number | Name | Date |
| --- | --- | --- |
| 2,218,439 | Rothrock | Oct. 15, 1940 |
| 2,409,633 | Kropa | Oct. 22, 1946 |
| 2,433,616 | Marple et al. | Dec. 30, 1947 |